United States Patent
Alchalabi et al.

(10) Patent No.: US 6,354,110 B1
(45) Date of Patent: Mar. 12, 2002

(54) ENHANCED HEAT TRANSFER THROUGH CONTROLLED INTERACTION OF SEPARATE FUEL-RICH AND FUEL-LEAN FLAMES IN GLASS FURNACES

(75) Inventors: Rifat Alchalabi, Fanwood; Donald Prentice Satchell, Jr., Berkeley Heights; Sekharipuram V. Krishnan, Scotch Plains, all of NJ (US)

(73) Assignee: The BOC Group, Inc., Murray Hill, NJ (US)

( * ) Notice: Subject to any disclaimer, the term of this patent is extended or adjusted under 35 U.S.C. 154(b) by 0 days.

(21) Appl. No.: 09/384,065

(22) Filed: Aug. 26, 1999

(51) Int. Cl.⁷ ............................................. C03B 5/225
(52) U.S. Cl. ..................................... 65/134.4; 65/136.3
(58) Field of Search ............................... 65/134.4, 136.3

(56) References Cited

U.S. PATENT DOCUMENTS

| | | | |
|---|---|---|---|
| 3,592,623 A | * | 7/1971 | Shepherd ................... 65/134.4 |
| 4,473,388 A | * | 9/1984 | Lauwers ...................... 65/134.4 |
| 4,531,960 A | * | 7/1985 | Desprez ...................... 65/134.4 |
| 4,911,744 A | * | 3/1990 | Petersson et al. .......... 65/134.4 |
| 5,139,558 A | | 8/1992 | Lauwers |
| 5,158,590 A | * | 10/1992 | Jouvaud et al. ............ 65/134.4 |
| 5,346,524 A | | 9/1994 | Shamp et al. |
| 5,387,100 A | | 2/1995 | Kobayashi |
| 5,643,348 A | | 7/1997 | Shamp et al. |
| 6,237,369 B1 | * | 5/2001 | LeBlanc et al. ........... 65/134.1 |

* cited by examiner

Primary Examiner—Sean Vincent
(74) Attorney, Agent, or Firm—Joshua L. Cohen; Salvatore P. Pace

(57) ABSTRACT

In an industrial furnace used to melt glass batch or glass melt least two oxy-fuel burners are employed in the roof or side-wall of the furnace. At least one oxy-fuel burner is operated with a fuel-rich mixture and at least one other oxy-fuel burner is operated with a fuel-lean mixture. The flames are directed to intersect near the surface of the batch or the melt in order to substantially complete combustion in the vicinity of the melt thereby increasing heat transferred to the material to be melted while also reducing flame temperatures near the burner block. Axisymmetric burners are employed in the crown or roof while non-axisymmetric burners are employed in the side-wall of the furnace. Alternatively, curved burners could be employed in either location to enhance control of the respective fuel-rich and fuel-lean flame interaction.

22 Claims, 4 Drawing Sheets

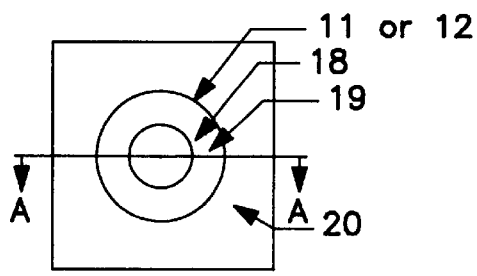
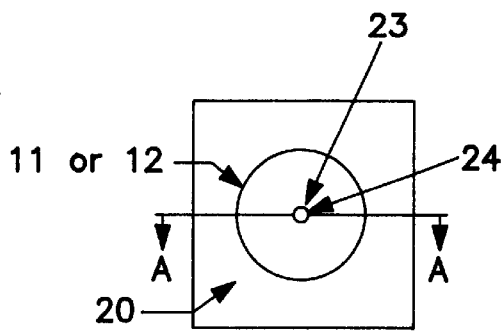
FIG. 3  FIG. 5
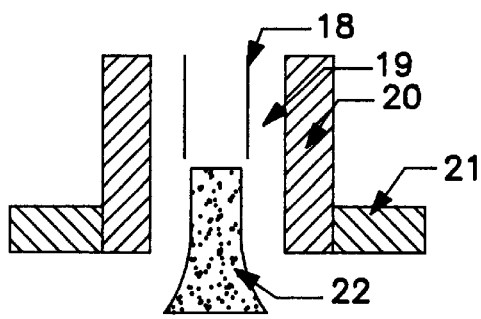
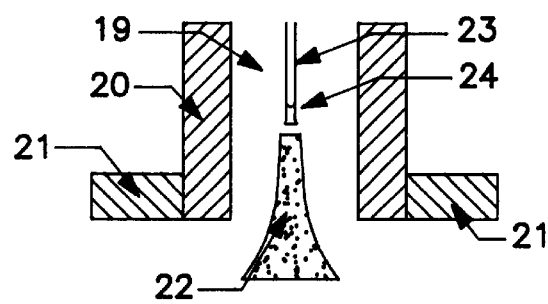
FIG. 4  FIG. 6

ENHANCED HEAT TRANSFER THROUGH CONTROLLED INTERACTION OF SEPARATE FUEL-RICH AND FUEL-LEAN FLAMES IN GLASS FURNACES

CROSS-REFERENCE TO RELATED APPLICATIONS

Not applicable.

BACKGROUND OF THE INVENTION

This invention relates to an improved industrial furnace and burner system used to melt and refine glass. More specifically, this invention relates to system of interacting fuel-rich and fuel-lean flames generated by at least a pair of oxy-fuel burners to enhance heat transfer to the material to be melted, glass melt or batch, by maximizing the flame area and temperature in contact with the solid batch or liquid melt interface.

Traditionally, glass production furnaces have relied on air-fuel burners as the primary heat source. In order to achieve reasonable overall process thermal efficiencies, either regenerative or recuperative heat recovery systems are typically used to preheat the air feed. A regenerative heat recovery system pre-heats the air feed by alternately using the hot furnace off-gases to heat refractory and then using this hot refractory to preheat the air feed. A recuperative waste heat recovery system achieves the same goal using a shell and tube heat exchanger to transfer heat from the hot furnace gases to the air feed through a metallic tube wall. The air-based combustion systems have two major disadvantages.

First, the predominate mode for heat transfer with air fired system is conduction from the hot combustion gases to the refractory walls and roof and radiation from the refractory surfaces to the glass melt. This heat transfer rate is severely limited by the maximum operating temperature of the furnace refractory, low emissivity of the glass melt, and low thermal conductivity of the glass melt. Bubblers are typically used to somewhat increase the glass melt circulation and increase the effective conductivity of the glass melt. In addition, electrical resistance heating can be used to significantly increase the glass melting rate with a substantial increase in operating costs. However, the maximum roof temperature and low glass melt emissivity significantly limits the specific glass melting rate, typically measured as tons of glass/ft$^2$/day. This low specific melting rate significantly increases the furnace capital cost.

The second problem with air based combustion systems is that recuperative and regenerative heat recovery systems are expensive and typically contaminants in the furnace off-gas plug and degrade recuperators and regenerators over time. As a result, recuperative and regenerative heat recovery systems significantly increase capital and maintenance costs and degrade furnace performance over time.

Oxy-fuel burners and electrical resistance heating have been used for many years to compensate for the adverse effect of the degradation in productivity of recuperative and regenerative over time. Oxy-fuel burners have had two traditional problems. First, the use of substantially pure oxygen increases the furnace operating cost. Second, oxy-fuel burners have a shorter and hotter flame. This shorter and hotter flame can cause localized overheating of refractory in the region of the burner. In addition, the short flame of oxy-fuel burners makes it difficult to heat the glass melt near the center of large furnaces.

U.S. Pat. No. 6,237,369 to LeBlanc et al. discloses controlling the velocity of gaseous fuel and oxygen in an oxy-fuel burner mounted in the roof of a glass melting furnace for increasing the melting rate of the glass.

U.S. Pat. No. 5,139,558 to Lauwers discloses the use of oxy-fuel burners located on the furnace roof and aimed at the interface between the batch and the melt in order to increase the melting rate of the glass and to prevent batch materials from entering the upstream zone. However, because the furnace roof to glass melt distance of often greater than typical oxy-fuel flame length, the thermal efficiency of the process is not adequate for use outside of regenerative or recuperative furnaces.

U.S. Pat. Nos. 5,346,524 and 5,643,348 to Shamp et al. attempt to overcome this problem by injecting oxygen and fuel at separate points and producing a large combustion "flame cloud" in the center of the furnace. This approach eliminates the oxy-fuel flame length limitation, but suffers from a safety problem. There is no apparent reliable method to heat the fuel and oxidant prior to mixing to maintain reliable ignition of the fuel and oxidant of this process. Premature mixing of the fuel and oxidant could lead to explosions.

In U.S. Pat. No. 5,387,100 to Kobayshi the use of rich and lean fuel streams to reduce $NO_x$ emissions is disclosed, however, there is no teaching regarding the interacting of fuel-rich and fuel-lean flames to increase the transfer of heat to the batch or melt.

Therefore, there is a clear and long standing need for a burner and furnace design that increases the oxy-fuel flame length, increases the heat transfer from the flame to the solid glass forming components and glass melt, while decreasing the heat transfer to the furnace roof or side-walls.

SUMMARY OF THE INVENTION

Accordingly, the present invention increases the amount of heat transferred to the melt in a furnace by using at least one pair of burners designed to each emit either a fuel-rich and fuel-lean flame which flames are directed to interact in the vicinity of the melt or batch material.

Furthermore, in the present invention fuel-rich and fuel-lean flames are emitted with a lower thermal energy and higher chemical energy than conventional oxy-fuel flames to transfer more heat to the batch materials or melt and direct heat away from the roof or side-walls of the furnace.

Reaction 1 illustrates conventional $O_2$-fuel combustion.

$$C_aH_b + c[a+b/4]O_2 \rightarrow aCO_2 + b/2\, H_2O + [c-1][a+b/4]O_2 \qquad [1]$$

Where, $C_aH_b$ represents a gaseous or liquid fuel and c is the fraction of the stoichiometric oxygen addition. Typically c ranges from 0.8 to 1.3 and preferably from 0.9 to 1.2 depending on the quantity of air ingression into the glass melting furnace. Values of c less than unity may be used to increase the flame luminosity. However, a secondary oxygen source is required in order to consume all the carbon monoxide and hydrogen before discharging the combustion gases to the atmosphere. Combustion with substantially pure oxygen produces a very hot and short flame relative to air-fuel combustion. This very short and very hot flame results in very high heating rates in the region of the burner, which can cause excessive heating of the burner block or furnace refractory rather than heating of the glass forming material, particularly toward the center of the furnace. This invention overcomes this problem by producing fuel-rich and fuel-lean flame pairs that contain less thermal energy and much more chemical potential energy than conventional oxy-fuel flames.

Reaction 2 illustrates the stoiciometry for a fuel-rich flame.

$$zC_aH_b+[axz+a/2(1-x)z+byz/4]O_2 \to axzCO_2+a(1-x)zCO+(byz/2)H_2O+bz/2[1-y]H_2 \quad [2]$$

The actual combustion process would contain many more species. In Reaction [2], the CO and $H_2$ products can be further oxidized to $CO_2$ and $H_2O$ to subsequently release additional thermal energy. Reaction [2] is intended only to illustrate the overall stoichiometry of this combustion process. Where, x and y are the fraction of the carbon and hydrogen, respectively, in the liquid or gaseous fuel that are fully oxidized in the fuel-rich flame. Typically, x and y would be in the range of 0.1 to 0.8. In addition, z is fraction of the gaseous or liquid fuel that is used in the fuel-rich flame. The balance of the fuel would be used in the fuel-lean flame.

Since both the fuel-rich and fuel-lean flames have a much lower temperatures than conventional $O_2$-fuel flames, much less heat is transferred to the burner block and refractory in the region of the burner. These fuel-rich and fuel-lean flames are advantageously directed toward a common area near the interface of the batch material or the melt. As the flames interact, combustion can be completed near the batch material or batch/melt interface, which results in higher temperature combustion gases in contact with batch materials or the melt and, therefore, more efficient heat transfer to the batch material or melt.

Furthermore, by initiating combustion at the burner block and completing a substantial portion of the combustion at a secondary combustion zone in the vicinity of the batch or melt various dissociation reactions take place. The dissociated radicals impinge on the melt surface and recombine exothermically giving up additional heat to the melt.

A further object of the present invention is an increased uniformity of the heat distribution at the melt or batch surface.

A still further object of the present invention is the reduced exposure to heat of the burner assembly due to the lower temperature of the flame near the burner. Such a reduction in heat at the burner should result in an increased operating life for the burners.

Yet another advantage of the present invention is the lower fuel consumption and lower oxidant ($O_2$) consumption per tons of melt processed by the furnace.

In one embodiment axisymmetric burners are placed in the roof of a furnace according to the present invention.

In another embodiment non-axisymmetric or axisymmetric burners are placed in the side-walls of a furnace according to the present invention.

In yet another embodiment of the present invention curved burners are placed in either the side-wall or roof of a furnace according to the present invention providing a means for altering the combustion intensity profile inside the furnace.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention.

FIG. 3 is a front view of an axisymmetric burner for use in an embodiment of the present invention.

FIG. 4 is a cross-sectional view of the axisymmetric burner of FIG. 3 taken through line A—A.

FIG. 5 is a front view of another axisymmetric burner for use in an embodiment of the present invention.

FIG. 6 is a cross-sectional view of the axisymmetric burner of FIG. 5 taken through line A—A.

DETAILED DESCRIPTION OF THE INVENTION

This invention advantageously uses the interaction of relatively cool fuel-rich and fuel-lean oxy-fuel flames to produce hotter combustion gases at a position in an industrial furnace that is displaced from the burners and is near the vicinity of the glass forming solids and glass melt. This process efficiency increase with increasing gas temperature and increasing interfacial area between the hot combustion gases.

This invention advantageously uses axisymmetric and non-axisymmetric burners. The axisymmetric burner produces a flame that can more effectively heat at further distances from the burner. The non-axisymmetric burner produces a flame that has a larger interfacial area between the batch material and the melt at shorter distances from the burner. Roof mounted burners would typically be axisymmetric and furnace wall mounted burners would typically be non-axisymmetric because the roof is a greater distance from the surface of the melt in an industrial furnace. For very large furnaces, side wall mounted axisymmetric burners or a combination of axisymmetric and non-axisymmetric burners can be used.

Reference will now be made in detail to the present preferred embodiments of the invention, examples of which are illustrated in the accompanying drawings.

Figures 1, 2:
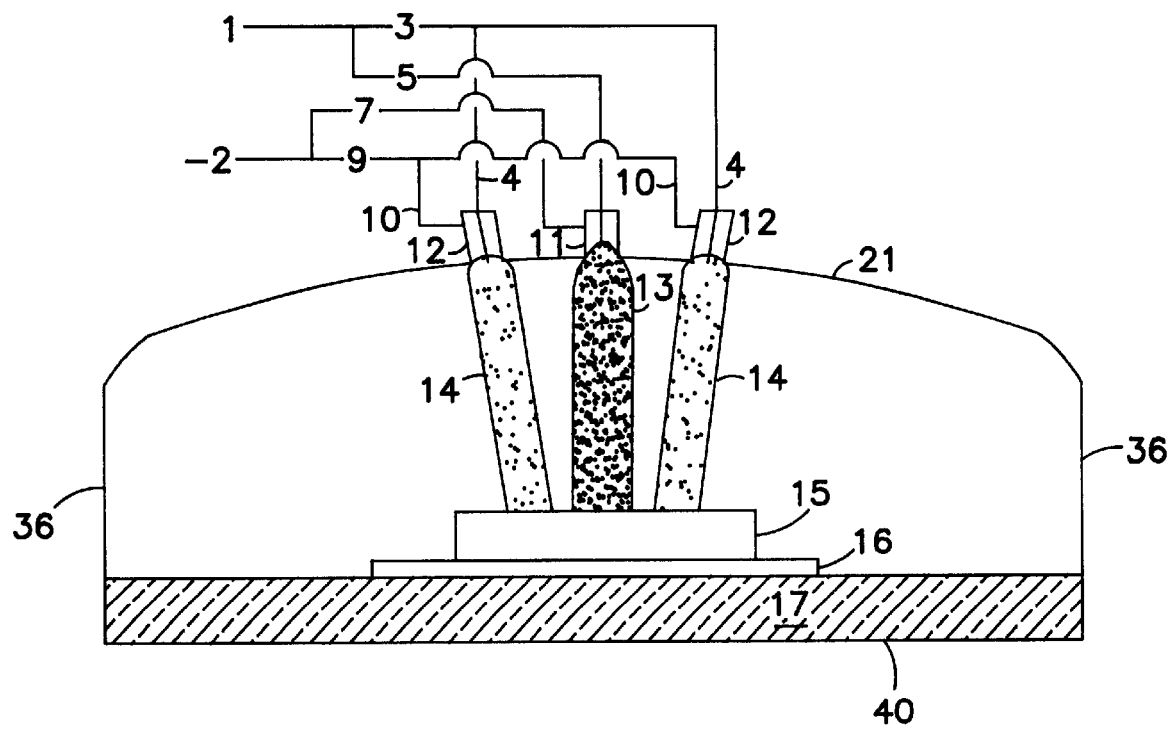
FIG. 1 a diagrammatic elevational representation of one embodiment of a furnace according to the present invention wherein the burners are located in the roof of the furnace.
FIG. 2 is a plan view of the layout of a burner block according to the present invention.

FIG. 1 illustrates the use of this invention with axisymmetric roof burners 11 and 12 placed in the roof (crown) 21 of an industrial furnace also having side walls 36 and a bottom 40. The hydrocarbon fuel feed 1 would typically be used with either a gaseous or liquid hydrocarbon fuel. Natural gas, predominately methane, is the most common gaseous fuel. Liquid hydrocarbon fuels have values of (a) in reaction [1] greater than four. Fuel oils are the most common liquid hydrocarbon fuel used in industrial furnaces and would have values of (a) in reactions [1] or [2] of greater than 10 and H/C, or b/a ratio, between 2 and 1. This invention preferably uses a substantially pure oxygen feed 2.

Substantially pure oxygen preferably has an $O_2$ concentration greater than 70 volume (or molar) percent and more preferably greater than 90 percent. The overall hydrocarbon fuel feed 1 and oxygen feed 2 are adjusted such that the value of c in Reactions [1] or [2] is greater than 0.7 and less than 13. More preferably the value of c is between 0.9 and 12.

The hydrocarbon fuel feed 1 is divided into a hydrocarbon fuel feed 5 for production of the fuel-rich flames 13 by fuel-rich burner 11 and a hydrocarbon fuel feed 3 for production of fuel-lean flames 14 by fuel-lean burners 12. If there are multiple fuel-rich flames 13, then the hydrocarbon fuel feed 5 of the fuel-rich flames 13 would be further divided into additional hydrocarbon fuel feeds for each individual fuel-rich burners 11. The ratio of the hydrocarbon stream in hydrocarbon fuel feed 5 to the hydrocarbon stream in hydrocarbon fuel feed 1 is the value of z in Reactions [1] or [2]. The balance of the fuel (1−z) is fed via hydrocarbon fuel feed 3 to the fuel-lean burners 12.

The substantially pure oxygen feed 2 is divided into an oxygen feed 7 for the fuel-rich burner 11 and an oxygen feed 9 for the fuel-lean burner 12. Typically, more than one fuel-lean flame 14 would be used in conjunction with each fuel-rich flame 13. As a result, both the hydrocarbon fuel feed 3 and substantially pure oxygen feed 9 would be divided into hydrocarbon fuel feeds 4 and substantially pure oxygen feeds 10 for the fuel-lean burners 12 that produce the fuel-lean flames 14. Preferably, the overall gas flow rate for each fuel-lean flame 14 and fuel-rich fame 13 are roughly equal. The velocity of the combustion gases of the fuel-rich flames 13 and the fuel-lean flame 14 should be between 150 and 500 feet per second at the exit of the burner block 20.

The relative flow rates of the hydrocarbon fuel feeds 4 and substantially pure oxygen feed 10 for the fuel-lean burners 12 to produce a fuel-lean flame 14 and the hydrocarbon fuel feed 5 and substantially pure oxygen feed 7 for the fuel-rich burner 11 for producing a fuel-rich flame 13 are adjusted to the minimum adiabatic flame temperature that provides a stable flame. The adiabatic flame temperature for the fuel-rich flame 13 and fuel-lean flames 14 should be between 800° C. and less than 2000° C., preferably greater than 1000° C. and less than 1600° C. The adiabatic flame temperature of the fuel-rich flame 13 and fuel-lean flames 14 are estimated using standard methods in the example. The calculated temperature of fuel-rich flame 13 and fuel-lean flames 14 can be adjusted to the desired values by adjusting the values of x, y, and z accordingly.

The lower values of x and y, with constant adiabatic flame temperature, may be advantageously used by preheating the gaseous hydrocarbon fuel feed 1 and/or the oxidant fuel feed 2. The values of x, y, and z determine both the fuel to oxidant feed rates for the fuel-lean burner 12 and the fuel to oxidant feed ratio for the fuel-rich burner 11. The absolute values of the these flow rates are set by the desired total thermal heat output of the assembly of fuel-rich and fuel-lean burners.

The distance between the fuel-rich 11 and fuel-lean 12 burners and the batch 16 or the top surface of the melt 17 is typically between 4 and 12 feet. As mentioned previously, the velocity of the combustion gases of the fuel-rich flames 13 and the fuel-lean flame 14 should be between 150 and 500 feet per second at the exit of the fuel-rich burners 11 and fuel-lean burners 12. The burner to batch/melt distance and nature of the melt surface determine the optimum combustion gas velocity. The required velocity increases with increasing burner to batch/melt distance. The burner velocity is limited by entrainment of solid particles.

Fuel-rich flame 13 and fuel-lean flames 14 are directed toward a high temperature secondary combustion zone 15 in the vicinity of the upper surface of the melt 17. This objective can be accomplished by directing the fuel-rich flame 13 and fuel-lean flame 14 to intersect above the melt 17 so that hot gases from the secondary combustion zone 15 flow to the surface of the melt 17.

Alternatively, the fuel-rich flame 13 and fuel-lean flames 14 could intersect near the surface of the batch and the secondary combustion could occur in the radial flow of gases along the surface of the melt 17. The preferred strategy will be determined by the process goals by one skilled in the art.

FIG. 2 depicts the arrangement of a set of fuel-rich burners 11 and a set of fuel-lean burners 12 according to an embodiment of the present invention in which six burners are placed in the roof of furnace such as that depicted in FIG. 1. A fuel-lean burner 12 is placed on each side of a fuel-rich burner 11.

FIGS. 3, 4, 5 and 6 illustrate the key components of the gaseous hydrocarbon fuel and liquid hydrocarbon fuel axisymmetric fuel-rich burners 11 and fuel-lean burners 12 respectively. As depicted in FIGS. 3 and 4 the gas hydrocarbon fuel axisymmetric fuel-rich burner 11 or fuel-lean burner 12 consists of a cylindrical metallic or ceramic gaseous fuel passage 18, an annular substantially pure oxygen passage 19 and a burner block 20. The gaseous fuel passage 18 is advantageously retracted into the burner block 20. The burner block 20 may be mounted flush with the furnace crown 21, as shown on FIG. 1, or protruding into the furnace from the crown or roof 21. Alternatively, oxygen may be fed through the central pipe 18 and fuel fed through annulus 19.

The axisymmetric liquid hydrocarbon fuel-rich burner 11 or fuel-lean burner 12 depicted in FIGS. 5 and 6 is very similar to the gaseous fuel burner of FIGS. 3 and 4. Basically, the liquid fuel passage 23 and liquid atomizer 24 is substituted for the gaseous fuel passage 18. The liquid fuel atomizer 24 could use only liquid hydrocarbon fuel pressure or gas, preferably substantially pure $O_2$, to assist atomization. The atomized liquid fuel and substantially pure $O_2$ are mixed to produce a flame 22 that can be either a fuel-rich flame 13 or a fuel lean flame 14.

Figure 7:
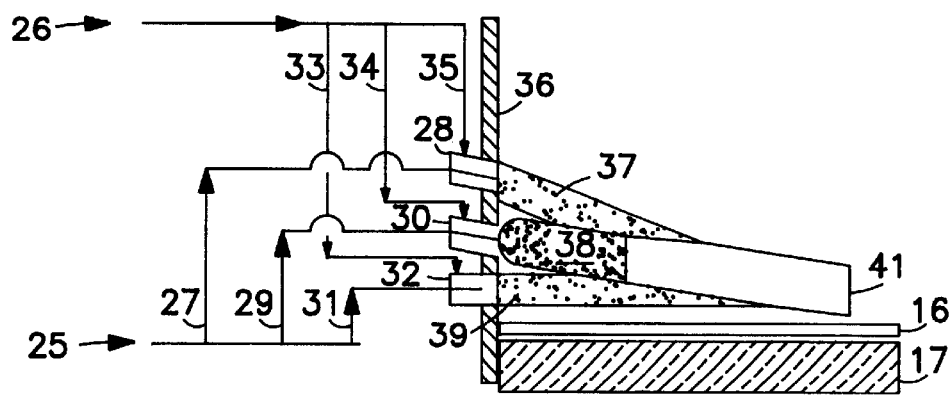
FIG. 7 is a diagrammatic elevational representation of a second embodiment of a furnace according to the present wherein the burners are located in the side-wall of the present invention.

FIG. 7 illustrates another embodiment of the present invention in which non-axisymmetric fuel-lean burners 28 and 32 and fuel-rich burner 30 are mounted in side wall 36 to enhance the glass melting process. The specifications for the hydrocarbon fuel feed 25 and substantially pure oxygen feed 26 for the non-axisymmetric fuel-rich burner 30 and fuel-lean burners 28 and 32 are identical to the specifications for the hydrocarbon fuel feed 1 and substantially pure oxygen feed 2 for the axisymmetric burner 11 or 12. The flow rates of the upper non-axisymmetric fuel-lean flame 37 and the non-axisymmetric fuel-rich flame 38 should be roughly equal. The flow rate and velocity of the lower non-axisymmetric fuel-lean flame 39 can advantageously be relatively higher to help direct the flame toward the batch 16 and the surface of the melt 17. The velocity of the non-axisymmetric flames should be between 40 and 200 feet per second at the exit of the burner block 44. The adiabatic flame temperature of the fuel-rich flame 38 and the fuel-lean flames 37 or 39 should be between 800° C. and 2000° C., more preferably between 1000° C. and 1600° C.

Fuel-lean burner 32 produces a substantially horizontal fuel-lean flame 39 while fuel-rich burner 30 and fuel-lean burner 32 produce angled fuel-rich flame 38 and fuel-lean flame 37 respectively. All three flames 37, 38, and 39 intersect in combustion zone 41 in the vicinity of the batch 16 or melt 17. The angles between the axis of the upper fuel lean flame 37 and the fuel-rich flame 38, relative to the axis of the lower fuel-lean flame 39 is adjusted such that the flame intersect at roughly a common point and the resulting intensification zone 41 in the region of the glass. The position of this flame intersection is adjusted to provide the desired heat transfer distribution, which is primarily a function of the furnace dimensions and values of x, y and z.

The major feature of the axisymmetric and non-axisymmetric burners are similar except with respect to lack of axial symmetry of the latter. FIGS. 8 and 9 and FIGS. 10 and 11 depict the gaseous non-axisymmetric and liquid non-axisymmetric burners 28, 30 and 32. Rather than having a cylindrical metallic or ceramic gaseous fuel passage 18 the non-axisymmetric burner 28, 30, or 32 has a gaseous fuel passage 42 having an elliptical cross section, and a substantially pure oxygen passage 43 also having an elliptical cross section and a burner block 44. The gaseous fuel passage 43 is advantageously retracted into the burner block 44. The burner block may be mounted flush with the side-wall 36 or protruding into the furnace from the side-wall 36 as depicted in FIG. 7.

Figure 8:
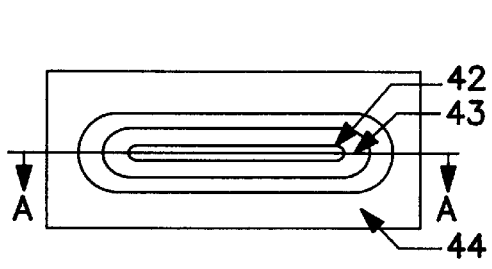
FIG. 8 is a front view of a non-axisymmetric burner for use in the furnace of FIG. 7.
Figure 10:
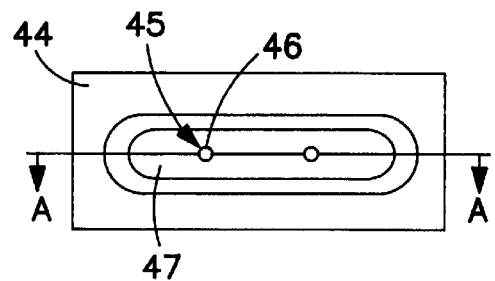
FIG. 10 is a front view of another non-axisymmetric burner for use in the furnace of FIG. 7.
Figure 9:
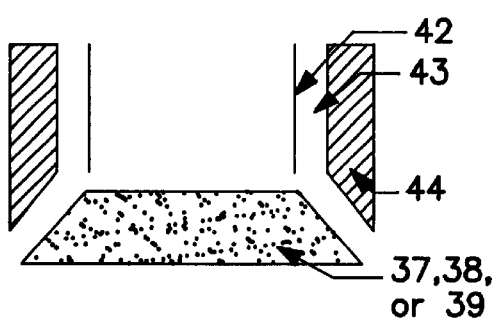
FIG. 9 is a cross-sectional view of the non-axisymmetric burner of FIG. 8 taken through line A—A.
Figure 11:
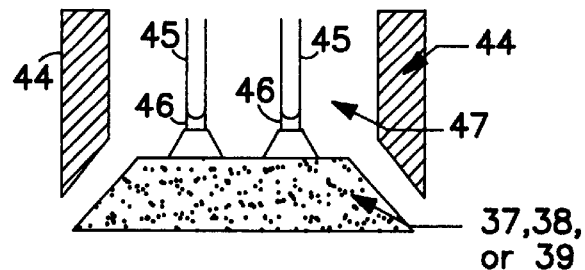
FIG. 11 is a cross-sectional view of the non-axisymmetric burner of FIG. 10.

The axisymmetric liquid hydrocarbon fuel burner 28, 30 or 32 in FIG. 7 are depicted in FIGS. 10 and 11 and are very similar to the gaseous fuel burner of FIGS. 8 and 9. Basically, the liquid fuel passage 45 and liquid atomizer 46 are substituted for the gaseous fuel passage 42 and substantially pure oxygen passage 47 replaces oxygen passage 43. The liquid fuel atomizer 46 could use only liquid hydrocarbon fuel pressure or gas, preferably substantially pure $O_2$, to assist atomization.

Figure 12:
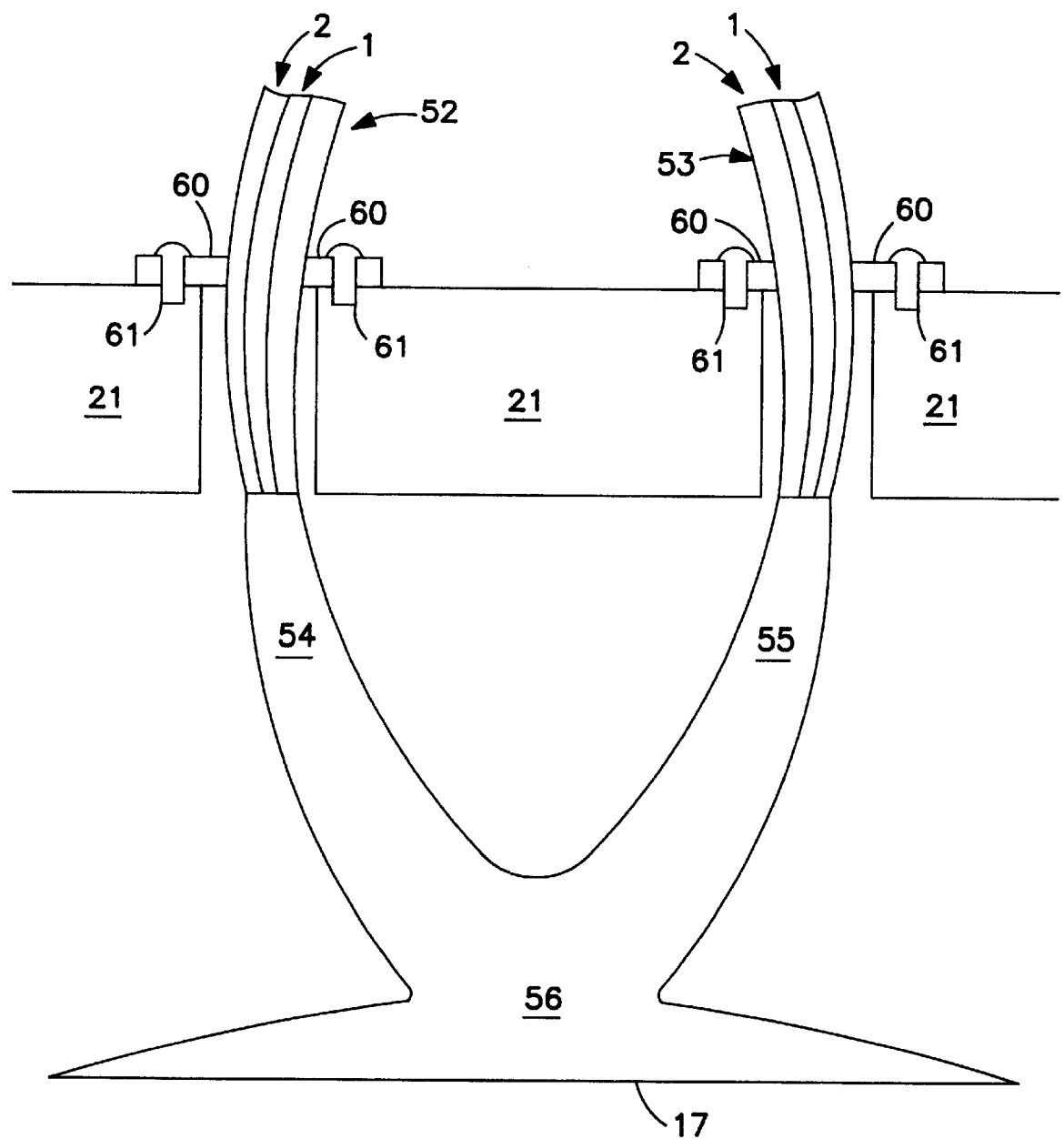
FIG. 12 is a cross-sectional view of a further embodiment of a furnace according to the present invention wherein the burners are curved.

FIG. 12 depicts a cross sectional view of a further embodiment of a burner block for use in the present invention. A curved fuel-lean burner 52 in crown 21 produces an arcing fuel-lean flame 54 which interacts in combustion zone 56 in the vicinity of melt 17 (or batch 16, not shown in FIG. 12) with arcing fuel-rich flame 55 which is produced by curved fuel-lean burner 53. Curved burners 52 and 53 are mounted in crown 21 using mounting bracket 60 held to crown 21 by mounting bolts 61. A handle (not shown) can be mounted on the exterior of the burner 52 or 53.

The curved burner 52 or 53 can be used in various configurations other than being opposed from another curved burner as depicted in FIG. 12. A straight fuel-rich burner could be interposed between two curved fuel-lean burners directed to have their respective flames intersect near the batch or melt.

Alternatively, one substantially straight fuel-rich burner could be surrounded by a multiplicity of curved burners which are all directed to have their respective flames intersect near the batch or melt.

It will be apparent to those skilled in the art that various modifications and variations can be made to the structure and methodology of the present invention without departing from the scope or spirit of the invention. In view of the foregoing, it is intended that the present invention cover modifications and variations of this invention provided they fall within the scope of the following claims and their equivalents.

We claim:

1. A method of melting glass in a furnace having at least a roof and side-walls comprising the steps of:
   generating at least one fuel-rich flame using an oxy-fuel burner;
   generating at least one fuel-lean flame using an oxy-fuel burner;
   intersecting said fuel-rich flame with said fuel-lean flame near the surface of the glass to produce a secondary combustion zone having a higher temperature than either the fuel-rich flame or the fuel lean flame thereby increasing the amount of heat transferred to the glass while reducing the amount of heat transferred to the roof or side-walls of the furnace.

2. The method claim 1 wherein said oxy-fuel burners are mounted in a burner block in the roof of the industrial furnace.

3. The method of claim 2 wherein said oxy-fuel burners are axisymmetric.

4. The method of claim 1 wherein said oxy-fuel burners are mounted in a burner block in at least one side-wall of the industrial furnace.

5. The method of claim 4 wherein said oxy-fuel burners are non-axisymmetric.

6. The method of claim 1 wherein the velocity of said fuel-rich flame and said the fuel-lean flame are approximately equal.

7. The method of claim 6 wherein the velocity of each of said fuel-rich flame and said fuel-lean flame is between approximately 150 feet per second and approximately 500 feet per second at the burner block.

8. The method of claim 1 wherein the adiabatic flame temperature of said fuel-rich flame and said fuel-lean flames are greater than approximately 800° C. and less than approximately 2000° C.

9. The method of claim 8 wherein the adiabatic flame temperature of said fuel-rich flame and said fuel-lean flames are greater than approximately 1000° C. and less than approximately 1600° C.

10. The method of claim 1 wherein said fuel rich flame and said fuel-lean flame are generated using a substantially pure oxygen feed.

11. The method of claim 10 wherein said substantially pure oxygen feed contains more than ninety volume percent oxygen.

12. The method of claim 1 wherein said glass is glass melt or glass batch material.

13. The method of claim 1 wherein said fuel rich flame and said fuel lean flame are generated using a gaseous hydrocarbon fuel.

14. The method of claim 13 wherein said gaseous hydrocarbon fuel is natural gas.

15. The method of claim 1 wherein said fuel-rich flame and said fuel-lean flames are generated using a liquid hydrocarbon fuel.

16. The method of claim 15 wherein said liquid hydrocarbon fuel is fuel oil.

17. The method of claim 2 wherein one fuel-rich flame is directed downward from the roof and substantially perpendicular to the surface of the glass and wherein a plurality of fuel-lean flames are directed at an angle from the roof to intersect with said fuel-rich flame near the surface of the glass.

18. The method of claim 5 wherein at least one non-axisymmetric fuel-rich flame is directed at a first downward angle from said side-wall to the surface of the glass and at least one non-axisymmetric fuel-lean flame is directed from said side-wall approximately horizontally above the surface of the glass.

19. The method of claim 18 wherein at least one non-axisymmetric fuel-lean flame is directed at a second downward angle from said side-wall to the surface of the material to be melted.

20. The method of claim 19 wherein said first downward angle is more oblique than said second downward angle.

21. The method of claim 1 wherein at least one of said oxy-fuel burners is curved.

22. The method of claim 21 wherein all oxy-fuel burners used to generate fuel-lean flames are curved.

* * * * *